Feb. 9, 1943. V. MULHOLLAND 2,310,704
BURNER MEANS ESPECIALLY FOR GLASS MAKING FURNACE OR TANK
Original Filed Dec. 16, 1939  2 Sheets-Sheet 1
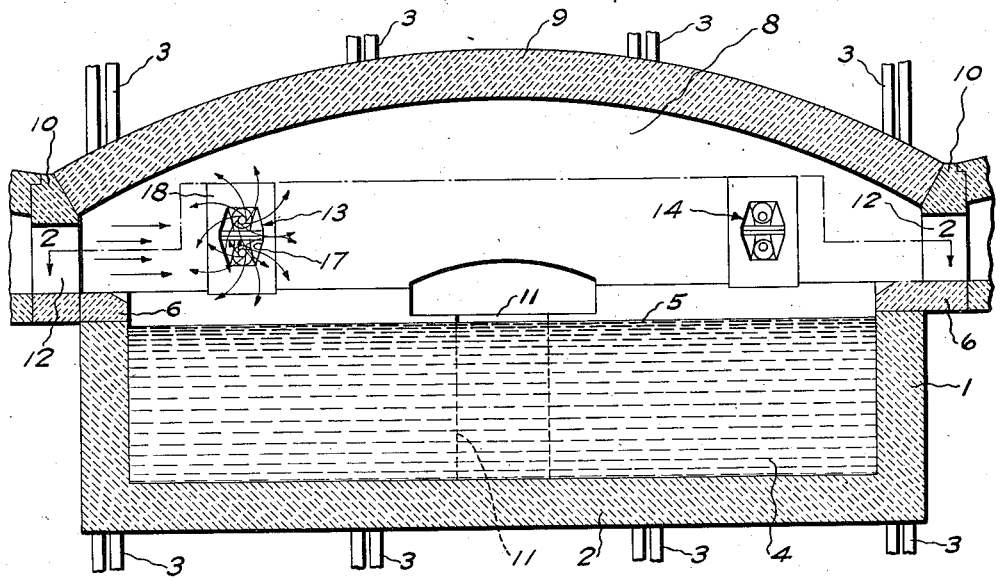
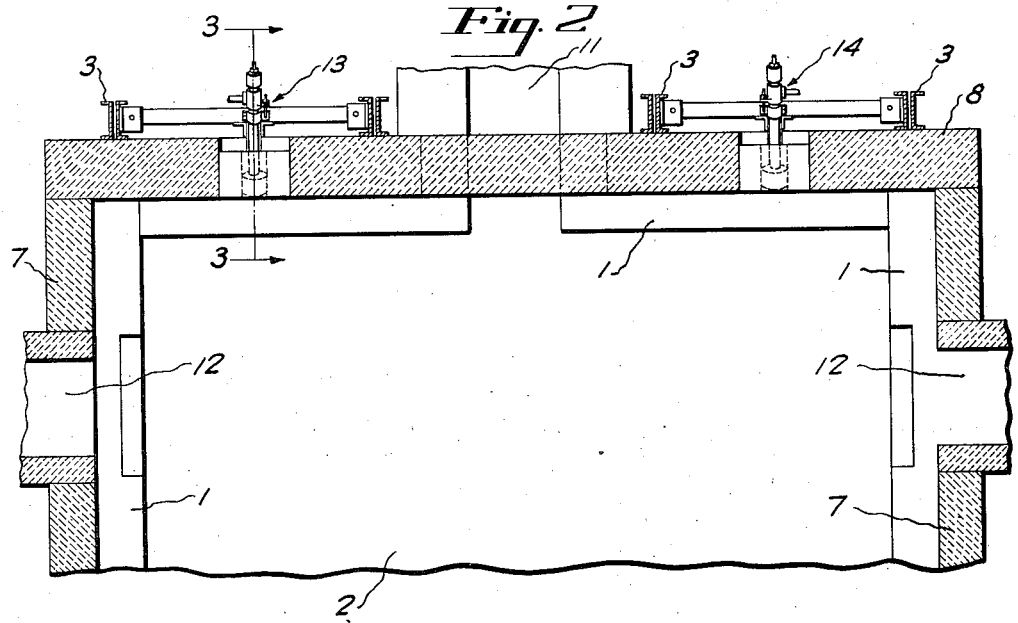
Inventor
Vergil Mulholland
by Brown & Parham
Attorneys
Witness:
B. X. Bartma Feb. 9, 1943. V. MULHOLLAND 2,310,704
BURNER MEANS ESPECIALLY FOR GLASS MAKING FURNACE OR TANK
Original Filed Dec. 16, 1939 2 Sheets-Sheet 2
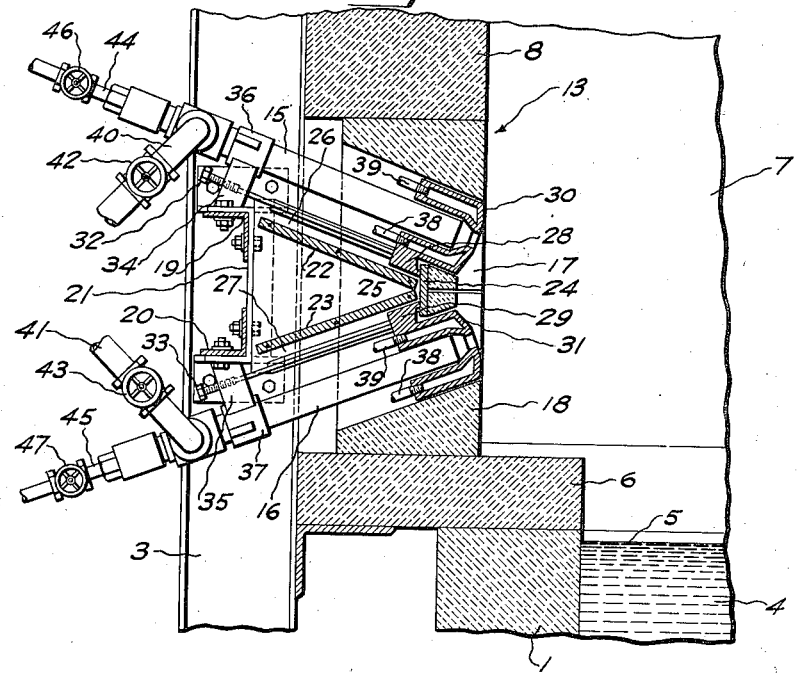
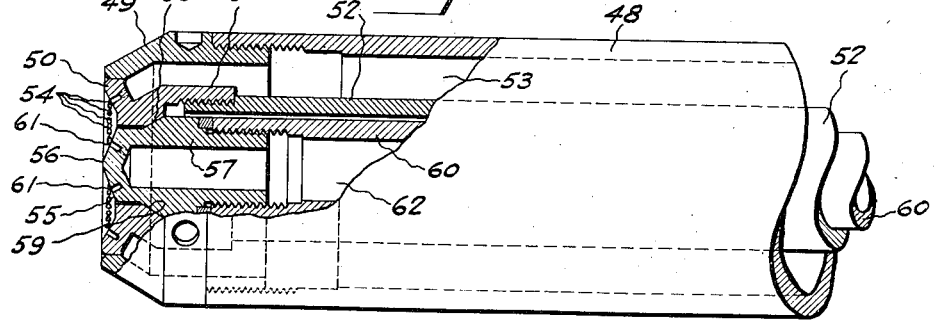
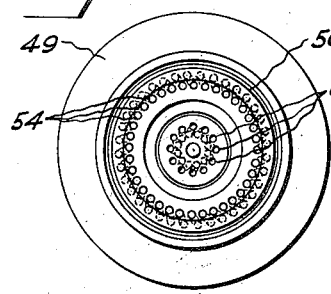 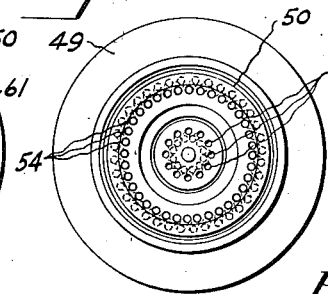 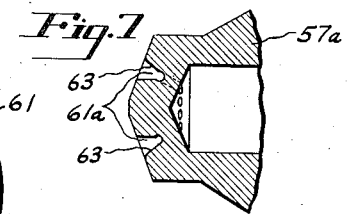
Inventor
Vergil Mulholland
by Brown & Cicham
Attorneys Patented Feb. 9, 1943

2,310,704

UNITED STATES PATENT OFFICE 2,310,704

BURNER MEANS, ESPECIALLY FOR GLASS-MAKING FURNACES OR TANKS

Vergil Mulholland, West Hartford, Conn., assignor to Hartford-Empire Company, Hartford, Conn., a corporation of Delaware Original application December 16, 1939, Serial No. 309,584. Divided and this application May 2, 1940, Serial No. 332,922

2 Claims. (Cl. 299—143)

This invention relates to a burner means especially for use in a glass making tank or furnace. The present application is a division of my prior and copending application, Serial No. 309,584, filed December 16, 1939, entitled "Glass making furnace or tank and burner means for use therewith."

Regenerative furnaces are commonly used by the prior art in the making of glass, many of these furnaces being supplied with fluid fuel, either oil or gas, in accordance with what fuel is available at the plant where the furnace is to be used. In a majority of these furnaces the fuel has been supplied at the sides in various relations in respect to the regenerator ports through which the preheated air is supplied to the furnace.

Particularly when using oil as a fuel, difficulties have arisen from time to time due to the relative inaccessibility of the burners through which the oil is supplied and to the requirement incident to the burning of oil that the burners be taken out and cleaned or replaced at fairly frequent intervals. As a result, several attempts have been made to supply fuel to regenerative glass making furnaces through the end wall, while supplying the preheated air from the regenerators through ports opening through the side walls.

This has been done with greater or less success in various installations, but in substantially all cases difficulties have arisen due to the sensitiveness of the adjustment or of the design, and particularly to the requirement that the burners be located in specific ways and directed at specific angles in order to provide the heat in a satisfactory manner without creating difficulties either with the making of the glass or due to the melting down of parts of the furnace.

These difficulties and the sensitiveness of the general arrangement to adjustment have arisen largely due to the fact that a burner projecting a high calorific value fuel longitudinally of the tank or furnace, in conjunction with laterally flowing air streams, tends to project such fuel and the flame therefrom a greater distance longitudinally of the tank than is desired before complete mixing with the air is effected and combustion is completed, there being an incomplete mixing of the fuel with the air adjacent to the rear of the tank and a consequent lack of the desired heat generation at this portion of the tank. The high velocity of the introduction of fuel and/or the atomizing air supplied therewith has resulted in some instances in a substantial fusion or erosion away of portions of the roof or bridge wall, due to the excessive generation of heat in this portion of the tank or furnace in conjunction with the action of the alkalis picked up from the batch and carried along by the combustion products. The batch is normally supplied to the tank adjacent to the rear thereof and, in some instances, has tended to float far forwardly and portions thereof have been mechanically picked up by the flames.

A further difficulty which has arisen in tanks of this type has been that of making good glass free from seeds, bubbles and unmelted glass making materials or batch. This is probably due to the fact that the high velocity flames from the burners located in the rear walls have tended to cause the floating portions of batch (which are of lower specific gravity than the glass) to move forwardly toward the bridge wall as a plurality of floating islands, each of which is impelled forwardly by the flames, in the same way as a sailing ship on the ocean is moved by the wind. The presence of this unmelted glass making material or batch in the portion of the tank where all the glass should have been melted and where refining thereof should normally take place has resulted in the incomplete refining of the glass and the presence of seeds or bubbles therein, which has resulted in inferior glass.

An object of the invention is to provide burner means in association with a glass making furnace or tank, which are constructed and arranged so that the flames from the burners will be deflected to a sufficient extent away from the lateral side walls in order that these walls may have a reasonable life.

A further and more specific object of the invention is to provide a burner means arranged in association with a wall defining a flame space of a glass making furnace or tank, which will provide a substantially flat sheet of flame above the glass of the bath and wherein this sheet of flame will have a relatively low velocity in a direction away from the burners, so that combustion may be completed in the time and space available and the heat will be distributed in a desired manner to the glass.

Specifically, it is an object of the invention to provide a pair of burners both disposed in a single substantially vertical plane and directed so that the flame of one will impinge upon the flame of the other to provide a sheet of flame as aforesaid, and wherein this sheet of flame may be deflected upwardly or downwardly by a suitable control of the fuel and/or air to one or both the burners.

A further specific object of the invention is to provide a glass making furnace or tank having a pair of vertically disposed burners as aforesaid which supply impinging flames to provide a substantially horizontal sheet of flame extending from in front of the burners, and wherein one and preferably both the burners of the cooperating pair are so arranged that the air and/or fuel of the burners will be given a swirling movement, and more specifically wherein both the air and the fuel from the burners will be swirled and the swirls will be in such directions that the swirling movement imparted to the flames by the upper burner will be in the opposite direction to that imparted to the flames by the lower burner of the pair. This is particularly useful to deflect laterally the sheet of flame from a pair of burners away from a wall extending in a generally longitudinal direction away from the wall with which the burner group is associated, and thus to prevent the undue destruction of such longitudinally extending wall.

A further specific object of the invention is to provide a burner group, as hereinabove set forth, wherein the burners impart oppositely directed swirls to the flames therefrom, this being particularly useful in conjunction with the rear wall of a glass making furnace or tank wherein regenerated air is supplied to the furnace or tank through the side walls, the directions of swirls from the burners being such that the air so supplied will be drawn into the flame to provide a desired rapid mixing with the fuel therein, and particularly provide for a distribution of the generation of heat in a desired manner over the glass.

A further specific object of the invention is to provide a particular burner construction as aforesaid wherein the air is supplied from the burner in a plurality of streams, all lying substantially in the surface of a cone and wherein the fluid fuel, such as oil, is supplied in a plurality of streams from within the source of air streams and also in the form of a cone, the cone of the air streams being converging from the burner and that of the fuel streams being diverging from the burner, so as to provide a desired type of mixing of the fuel and air resulting in the rapid and complete atomization of the fuel and in the complete combustion thereof, while using a minimum amount of atomizing air.

Further and more detailed objects of the present invention will become apparent from the following description of a specific embodiment thereof and will be pointed out in the appended claims.

In the drawings:

Figure 1 is a view substantially in transverse vertical section of an end-fired glass making furnace or tank having laterally opening regenerator ports, the view being taken from a median portion of the tank looking toward the rear thereof;

Fig. 2 is a fragmentary view substantially in horizontal section on the line 2—2 of Fig. 1;

Fig. 3 is a fragmentary view on an enlarged scale and in vertical section substantially on the line 3—3 of Fig. 2;

Fig. 4 is a view partly in elevation and partly broken away and in transverse section of one of the burners constructed in accordance with this invention;

Fig. 5 is an end view of the discharge end of the burner of Fig. 4 as seen from the left in that figure;

Fig. 6 is a fragmentary view, similar to Fig. 5, but showing a somewhat different arrangement of nozzle openings in the discharge end of the burner; and Fig. 7 is an enlarged detail view, similar to a part of Fig. 4, illustrating a modified form of the discharge apertures for the fluid fuel.

While it is contemplated that the present invention may be employed with glass tanks wherein no heat recovery is attempted, such for example as small day tanks, and while the present invention is also considered to be adaptable to tanks wherein heat recovery is effected by recuperators as well as by regenerators, and/or wherein preheated air is introduced through the end wall instead of or in addition to through the side walls, there is shown for purposes of illustration a tank with which a regenerative heat recovery system is associated. The drawings show, however, merely a plurality of regenerator ports in the side walls of the furnace or tank; and the burners are associated with the rear end wall. In the present instance a pair of burners are shown, although for certain tanks, including for example day tanks, but one burner group may be employed.

Turning now particularly to the drawings, there is illustrated in Figs. 1, 2 and 3, a tank or furnace for making glass, comprising a glass-containing basin including side and end walls 1, and a bottom 2, these portions of the furnace being constructed in any conventional manner, the illustration in the drawings being solely diagrammatic. There is also illustrated buck stays 3 by which the tank is supported in a conventional manner. In Figs. 1 and 3, a bath of molten glass 4 is illustrated which extends up to a normal surface level 5.

Above the glass-containing basin is the usual flame space, which is formed in a conventional manner by a marginal portion of tuck stone 6, side walls 7 and a rear wall 8. The flame space is defined at the top by a conventional arched roof 9 supported in the usual manner upon skew blocks 10.

Glass making materials or batch may be supplied to the bath 4 in any suitable or desired manner. There is shown a conventional doghouse 11 located midway of the rear end wall of the furnace.

Associated with the side walls 7 defining the flame space above the glass level 5 are a plurality of regenerator ports 12 through which preheated air is supplied alternately from one side and the other to traverse the flame space transversely thereof in the usual manner. The regenerators themselves are not shown in the drawings, but may be of any conventional or desired type.

Associated with the rear end wall 8 of the flame space and disposed symmetrically in respect to this wall are two burner groups generally indicated at 13 and 14, the burners of these groups being the same except as hereinafter noted.

During the normal operation of the tank and as seen in Figs. 1 and 2, the burner group 13 will be operated during the time preheated air is being supplied from the left hand regenerator ports, as shown by the arrows in Fig. 1. At this time, the burner group 14 will be out of operation, but will remain in position. When the direction of firing is reversed, as is done periodically, the air will be supplied to the combustion space from right to left, and burner group 14 will be operating, burner group 13 being out of operation during this period.

Referring now more particularly to Fig. 3, each of the burner groups 13 and 14 comprise a pair of burners including an upper burner 15 and a lower burner 16, these burners preferably being identical with one another except as hereinafter noted. The burners 15 and 16 are preferably in vertical alignment with one another, that is in the same vertical plane, and are arranged to project fluid fuel and atomizing air through suitable apertures 17 in burner blocks, generally indicated at 18, which are set into the wall 8 as shown in Figs. 1 and 3.

Means are provided for mounting the burners 15 and 16 rigidly and adjustably, in the position shown, such means comprising a pair of structural angle members 19 and 20 adjustably secured to and extending between adjacent buck stays 3 as by the provision of brackets having elongate bolt holes therein (not shown) and supporting at the position of the burner group a built-up structural bracket member including the parts 21, 22, 23 and 24, all of which are secured together by vertically disposed plates 25 to which these parts are secured, as by welding, bolting or otherwise. This structural member may be interchangeable with others adapted to hold the burners 15 and 16 at different angles in their common vertical plane and/or to change the position of that vertical plane in respect to the longitudinal axis of the furnace or such adjustive provisions may be otherwise provided in any desired manner. The built-up structural member is formed to provide a pair of T-shaped slots 26 and 27 for the upper and lower burners respectively. Arranged for sliding movement in these slots are T-shaped supporting brackets 28 and 29 respectively, which carry water cooling chambers 30 and 31 respectively. The water cooling chambers 30 and 31 are shaped to receive and position the forward ends of the burners 15 and 16.

In order to position the water cooling chambers 30 and 31 accurately in the apertures 17 of the burner blocks 18, screw threaded studs 32 and 33 are provided, which pass through threaded openings in brackets 34 and 35 respectively and have their forward ends bearing upon the T-shaped brackets 28 and 29 respectively. The brackets 34 and 35 are secured to the angle members 19 and 20 by bolts, as shown, and carry collar members 36 and 37 respectively in which the rear portions of the burners 15 and 16 are received and positioned. The screws 32 and 33 normally will position the bracket members 28 and 29 in engagement with the stop member 24 of the rigid supporting structure, as shown.

Means are provided for supplying a cooling fluid, usually water, to and withdrawing it from the cooling chambers 30 and 31, such means in the present instance including pipes 38 and 39 and being otherwise conventional and hence not particularly illustrated herein.

Means are provided for supplying atomizing air and fluid fuel to the burners 15 and 16. As shown, atomizing air is supplied to these burners through pipes 40 and 41 respectively, this air being controlled by valves 42 and 43 respectively. Fluid fuel is supplied to the burners 15 and 16 through pipes 44 and 45 respectively under the control of valves 46 and 47 respectively.

While certain features of this invention may be practiced and certain of the advantages attained by the use of many different types of burners, it is preferred to employ in conjunction with the invention burners wherein either the atomizing air or fluid fuel, or both, are given a swirling movement. Inasmuch as the volume of air used is considerably larger than the volume of oil, if oil is employed, the swirling movement imparted to the atomizing air in an oil burner is of greater importance than is the swirling movement imparted to the oil. However, the preferable arrangement in accordance with this invention is one wherein the atomizing air is given a swirling movement in one direction, for example clockwise, and the fuel is given a swirling movement in the opposite direction, for example counterclockwise.

When using a pair of burners such as are shown at 15 and 16 in Fig. 3, the burners are disposed in a single vertical plane and are so directed that the flames therefrom will impinge upon one another at a point or zone inwardly of the furnace from the burner tips. It is preferred as aforesaid that the swirling movement imparted by one of the burners be in the opposite direction from that imparted by the other. This is indicated by arrows for the burner group 13, Fig. 1, wherein the swirling movement imparted by the upper burner 15 is counterclockwise, while that of the lower burner 16 is clockwise. This arrangement, particularly in conjunction with a burner group associated with a transverse supply of combustion-supporting air from the port 12, as indicated by the arrows in Fig. 1, results in a substantially horizontal sheet of flame extending over the bath of glass 4 in the furnace. This sheet of flame is deflected from a position aligned with the vertical plane of the burner in the direction of the center of the tank, to the right as seen in Fig. 1, and away from the left-hand wall adjacent to which the burner group 13 is located, thus effectively preventing the overheating and unduly rapid deterioration of this wall. This particular relation between the direction of swirls of the two burners of the group in conjunction with the supplying of combustion air laterally, as shown, also assists in drawing the combustion-supporting air into the zone of combustion between the flames of the burners and assists in the rapid and complete mixing of the air with the fuel. This results in more perfect combustion and in the generation of heat in the portions of the furnace where this heat is most desired, and, further, results in the reduction in the longitudinal velocity of the flame and the products of combustion, so as to prevent the rapid destruction of the portions of the tank, particularly the roof thereof, adjacent to the bridge wall and of the bridge wall itself and any structure thereabove (the bridge wall and structures thereover not being shown in the accompanying drawings).

Furthermore, the reduction in the velocity of the gases from the burner tends to reduce the effect of the flames and products of combustion in moving the batch piles, which float upon the surface 5 of the glass bath, away from the rear end of the furnace. The combustion system shown and described causes the generation of a large amount of heat adjacent to the rear of the furnace where it is desired in order that the batch may be completely melted in this zone of the furnace. Thus, unmelted batch will not move into the zone of the furnace where refining is intended to take place to contaminate the glass in that zone and to prevent the proper clearing and homogenizing thereof. This results in good quality glass being made in the furnace or tank.

Another desirable function of the combination thus far described is that by a suitable manipulation of some or all of the valves 42, 43, 46 and 47 controlling the supplying of air and fuel to the burners 15 and 16, it is possible to elevate or depress the plane of the flame from this burner group, which may be controlled to be a substantially horizontal plane parallel with the surface 5 of the bath of glass 4 in the furnace or may be deflected upwardly or downwardly by the relative intensities of the flames from the burners 15 and 16. It is possible, for example, to burn three-quarters of the fuel in one of the burners of the group and but one-quarter of the total fuel burned in this group in the other of the burners, a suitable amount of atomizing air being supplied to the two burners in accordance with the amount of fuel respectively supplied thereto. It is also possible by a suitable control of the flow of air and fuel to the burners of a group to deflect the flame downwardly from this group so that it will impinge upon the surface of the glass and then be deflected upwardly from this surface if this action is desired. The present disclosure does not attempt to teach any one specific desired manner of operating the burners, but merely teaches the construction and methods by which various effects may be had in accordance with the desires of the operators.

Turning now to the particular construction of the burner specifically illustrated in Figs. 4 and 5, this burner comprises an outer tubular body member or pipe 48 to which is threaded a head 49 at the discharge end of the burner and which forms a burner tip, including a reentrant annular forward wall 50. The head 49 also has an inwardly directed annular portion 51 to which is threaded a pipe 52. Air is supplied to the annular space or chamber 53 formed between the pipes 48 and 52 and bounded at its forward end by the head 49. The forward wall 50 of the burner tip 49 is provided with a circular series of apertures 54 through which the atomizing air passes from the burner. These apertures are disposed in such a manner that they all lie with their axes in the surface of a converging cone. Furthermore, the axes of these ports do not lie in lines such as would be formed by the intersection of a radial plane with the surface of this cone, but rather all lie at a particular angle in the same direction with respect to such intersection, so as to cause a sort of swirling motion to the air supplied therethrough. As shown in Fig. 5, the air passing from the apertures 54 will be given a swirling motion in a clockwise direction.

The burner tip 49 has a large circular axial aperture 55 in which is located the forward end wall portion 56 of a tip 57 for a fluid fuel. The forward end of the tip 57 is formed as a cylindrical body and is somewhat smaller than the aperture 55, so that it will not bind therewith even when the burner has been heated to a relatively high temperature during use. Rearwardly of the aperture 55, the tip 49 is formed with a conical face 58 which converges toward the forward end of the burner and is adapted to receive and tightly fit a complementary conical surface 59 formed on the tip 57. The tip 57 is carried by a pipe 60 threaded thereto, as shown, and extending rearwardly through the pipes 48 and 52, the several pipes being suitably secured together at the rear end of the burner in a conventional manner, not illustrated. Thus the pipe 60 and tip 57 may be withdrawn from the burner for cleaning or replacement at any time without interference with the tip 49 and the pipes 48 and 52, and during the continued operation of the air supplying portion of the burner.

The forward end wall 56 of the tip 57 is provided with a circular series of apertures 61 through which the fluid fuel is supplied from the interior of the tip 57, which may be considered a fuel chamber 62. The apertures 61 are so disposed that their axes will lie in the surface of a diverging cone and are also disposed therein at a predetermined angle in a single direction to lines which would be formed by the intersection of a radial plane with the surface of this diverging cone.

As shown in Fig. 5, the fluid fuel will also be given a swirling movement in a clockwise direction due to the disposition of the apertures 61. It is contemplated, however, that the air and fuel may be given swirling movements in opposite directions, as shown for example in Fig. 6, wherein the air is given a swirling movement in a counter-clockwise direction and the fuel is given a swirling movement in a clockwise direction. This reverse arrangement is the preferred form of burner, it being understood that both the directions of swirls of the air and fuel may be reversed. However, it is contemplated that any combination of clockwise and counterclockwise swirls may be employed as may be desired and in accordance with the spirit of the teachings given hereinabove.

Due to the convergence of the streams of air in conjunction with the divergence of the streams of fuel, there will be an intimate mixing of the air and fuel from the burner at a short distance from the discharge end thereof. This action is further improved by reverse swirling movements imparted to the air and fuel respectively and is still further improved when using a pair of burners, as shown at 15 and 16 of the group 13 of Fig. 1 wherein reverse swirls are given to the air and fuel of the upper and lower burners respectively.

Furthermore, as will be understood from the foregoing, the directions of swirls of the burners of the burner group 14 will preferably be the reverse respectively of those of the burners of group 13. In this respect, this application constitutes a continuation in part of applicant's copending application Serial No. 212,705, filed June 9, 1938, for "Method of and apparatus for firing and feeding batch to glass melting furnace."

In Fig. 7 there is shown a modified form for the openings through which the fluid fuel is discharged from the burner. The burner tip for fluid fuel is indicated in this figure at 57ᵃ and corresponds to the tip 57 of Fig. 4, with the exception of the shape or conformation of the apertures through which the fuel is discharged from the burner. These apertures are indicated at 61ᵃ in Fig. 7 and are formed at their outer ends with flaring portions indicated at 63.

For certain purposes, it has been found that a burner with flared fuel openings is more effective than one with the cylindrical openings as shown at 61 in Fig. 4. It has, for example, been found that when a pair of burners are used, as shown at 15 and 16 in Fig. 3, it may be desirable to use a tip, such as that shown at 57ᵃ, with one of the burners, while using the other burner with a tip as shown at 57 with straight-sided openings 61, Fig. 4. Any desired combination of burners using either of the tips of Figs. 4 or 7 may be employed within the purview of this invention.

While there is disclosed herein but one embodiment of this invention, I do not wish to be limited to this specific embodiment, but recognize that many variations may be made, not only in the specific type of burners, but in the arrangement thereof and in the arrangement of the burner groups in respect to the tank as a whole and to the combustion air supplying means therefor. The scope of this invention is to be defined in the appended claims, which are to be construed as broadly as the state of the prior art permits.

I claim:

1. A fluid fuel burner, comprising means defining an annular air passage and separate and distinct means defining a fuel passage within said air passage, said respective means being formed at the forward ends of the fuel and air passages to provide a concentric hole and a substantially smaller plug means arranged within said hole respectively, and rearwardly diverging conical surfaces formed on the air and fuel passage-forming means respectively and arranged to seat one against the other in rear of said hole and plug means, whereby the means forming said fuel passage is disposed in non-binding relation with the air passage-forming means and so that the fuel passage forming means may be withdrawn from the remainder of the burner for cleaning and replacement without interference with the means forming the air passage, said air and fuel passages both terminating at the forward end of the burner in nozzle openings, the nozzle openings for the air and for the fuel respectively being such as to cause atomizing air to be discharged from the burner substantially in the surface of a cone and the fuel to be discharged from the burner also substantially in the surface of a cone, said cones respectively being such that streams of the discharged air and fluid fuel will intersect each other at a predetermined distance from the discharge end of said burner.

2. A fluid fuel burner, comprising means defining an annular passage for atomizing air having a wall at the forward end thereof formed with an outwardly flaring annular front face, a circular series of passages from said annular air passage extending through said forward wall and opening through said outwardly flaring annular front face, the axes of each of the passages of said circular series all lying substantially in the surface of a cone and all being at a predetermined angle in one direction to lines in said surface, passage forming means for fluid fuel disposed within said annular air passage and having a forward wall formed with an outwardly tapering front face located within the outwardly flaring front face of the first-named forward wall, and a circular series of fluid fuel passages extending through the last-named forward wall and opening through the outwardly tapering front face thereof, all the passages of the last-named circular series lying with their axes substantially in the surface of a cone and at a predetermined angle in the opposite direction from that of the circular series of air passages, the cones defined by the oil and air passages respectively being such that the oil and air streams will intersect at a predetermined distance from the discharge end of said burner.

VERGIL MULHOLLAND.